(12) United States Patent
Fan

(10) Patent No.: US 9,384,702 B2
(45) Date of Patent: Jul. 5, 2016

(54) MULTIPLE PRIMARY COLORS LIQUID CRYSTAL DISPLAY AND DRIVING METHOD THEREOF

(71) Applicant: Shenzhen China Star Optoelectronics Technology Co., Ltd., Shenzhen (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 126 days.

(21) Appl. No.: 14/390,760

(22) PCT Filed: Aug. 21, 2014

(86) PCT No.: PCT/CN2014/084871
§ 371 (c)(1),
(2) Date: Oct. 3, 2014

(87) PCT Pub. No.: WO2016/019603
PCT Pub. Date: Feb. 11, 2016

(65) Prior Publication Data
US 2016/0042703 A1  Feb. 11, 2016

(30) Foreign Application Priority Data
Aug. 8, 2014  (CN) .......................... 2014 1 0391271

(51) Int. Cl.
*G09G 3/36* (2006.01)
*G02F 1/1335* (2006.01)
*G02F 1/1368* (2006.01)

(52) U.S. Cl.
CPC ............ *G09G 3/3607* (2013.01); *G02F 1/1368* (2013.01); *G02F 1/133514* (2013.01); *G02F 1/133603* (2013.01); *G02F 1/133621* (2013.01); *G09G 2320/0276* (2013.01); *G09G 2320/0666* (2013.01)

(58) Field of Classification Search
None
See application file for complete search history.

(56) References Cited

U.S. PATENT DOCUMENTS

| | | | | |
|---|---|---|---|---|
| 2006/0054782 A1* | 3/2006 | Olsen | ................... | G02B 3/0062 250/208.1 |
| 2007/0057885 A1* | 3/2007 | Kurumisawa | ........ | G09G 3/2003 345/89 |
| 2009/0058777 A1* | 3/2009 | Cheng | .................. | G09G 3/3607 345/88 |
| 2009/0129115 A1* | 5/2009 | Fine | ...................... | G02B 6/0021 362/606 |
| 2010/0134717 A1* | 6/2010 | Ikeda | .................... | G02F 1/1309 349/62 |

(Continued)

*Primary Examiner* — Andrew Sasinowski
*Assistant Examiner* — Henok Heyi
(74) *Attorney, Agent, or Firm* — Andrew C. Cheng

(57) ABSTRACT

The present invention provides a multiple primary colors liquid crystal display and a driving method thereof. The multiple primary colors liquid crystal display comprises a LED backlight source (1) and a liquid crystal display panel (3); the LED backlight source (1) comprises a plurality of red, green, blue and cyan LEDs (11, 12, 13, 14); the liquid crystal display panel (3) comprises a CF substrate (33), and the CF substrate (33) comprises a plurality of red, green and blue filters (331, 333, 335). The red, green and blue LEDs (11, 12, 13) are activated as showing the first color frame, and lights transmitting through the red, green and blue filters (331, 333, 335) respectively are red light R, green light G and blue light B; the red and cyan LEDs (11, 14) are activated as showing the second color frame, and lights transmitting through the red, green and blue filters (331, 333, 335) respectively are the red light R, a first cyan light C1 and a second cyan light C2, capable of basically and completely achieving all objects' colors of nature.

11 Claims, 7 Drawing Sheets

(56) References Cited

U.S. PATENT DOCUMENTS

2013/0093783 A1* 4/2013 Sullivan .................. G09G 5/06
  345/601
2014/0146251 A1* 5/2014 Lee ........................ G02B 27/26
  349/15

* cited by examiner

| Embodiment of the present invention | | | | Products of prior arts | |
|---|---|---|---|---|---|
| First color frame | Transmission rate | Second color frame | Transmission rate | YAG LED | Transmission rate |
| R | 1.58% | R | 2.30% | R | 1.10% |
| G | 4.97% | C1 | 4.76% | G | 5.40% |
| B | 1.15% | C2 | 1.65% | B | 0.90% |
| sum | 7.70% | sum | 8.71% | sum | 7.30% |

MULTIPLE PRIMARY COLORS LIQUID CRYSTAL DISPLAY AND DRIVING METHOD THEREOF

FIELD OF THE INVENTION

The present invention relates to a display skill field, and more particularly to a multiple primary colors liquid crystal display and a driving method thereof.

BACKGROUND OF THE INVENTION

A Liquid Crystal Display (LCD) possesses advantages of being ultra thin, power saved and radiation free. It has been widely utilized in, such as LCD TVs, mobile phones, PDAs (personal digital assistance), digital cameras, laptop screens or notebook screens.

The most liquid crystal displays on the market are backlight type liquid crystal displays, which comprises a shell, a liquid crystal panel located in the shell and a backlight module located in the shell.

The common structure of the present liquid crystal panel can comprise a Color Filter (CF) substrate, a Thin Film Transistor Array Substrate (TFT Array Substrate), and a Liquid Crystal Layer located between the two substrates. The working principle is that the light of backlight module is reflected to generate images by applying driving voltages to the two glass substrate for controlling the rotations of the liquid crystal molecules.

The backlight modules can be categorized side-light type backlight module and direct-light type backlight module. In the direct-light type backlight module, the light source, such as Cold Cathode Fluorescent Lamps (CCFL) or Light Emitting Diodes (LED) are located at the rare side of the liquid crystal panel, and the light is distributed by the diffuser plate to form an area light source for the liquid crystal panel. In the side-light type backlight module, the backlight source LED light bars are located at the rare and lateral sides. The light generated by the LED light bars enters the light guide plate (LGP) from the light incident side of the light guide plate. The light injects from the light emitting surface after reflection and diffusion. Then, after transmitting the optical film combination, the area light source is formed for the liquid crystal panel.

With the development of display technology, the liquid crystal display has developed to have high resolution and high color gamut. In the skills of prior arts, the main method of realizing high color gamut is to utilize a blue light emitting chip with the package of red and green phosphor powder and the thickness increase of color filter. As shown in FIG. 1, the LED with the traditional package of Yttrium Aluminum Garnet (YAG) is employed as the backlight source of the liquid crystal display. The NTSC color gamut is only 62% which is far from covering the color gamut range (Pointer's gamut) of all objects' colors of nature. Even for the liquid crystal display with improvements of the backlight source and the color filter to obtain a higher color gamut, the NTSC color gamut only can reach up to 92%, which still cannot cover all objects' colors of nature.

A Field Sequential Color (FSC) liquid crystal display is capable of expanding color gamut in advance. The present Field Sequential Color liquid crystal display rapidly shows red, green blue image information with time division on the liquid crystal display panel. With the human eyes' persistence of vision property, a colorful image can be synthesized. An image frame is divided as several sub color frames and red, green, blue sub images are sequentially displayed. By utilizing the persistence of vision with time division, three primary colors are overlaid and combined and accordingly, the colorful image is shown. However, the color gamut of the present Field Sequential Color liquid crystal display still cannot cover all objects' colors of nature.

SUMMARY OF THE INVENTION

An objective of the present invention is to provide a multiple primary colors liquid crystal display capable of performing multiple primary colors display to enormously expand color gamut of the liquid crystal display for basically and completely achieving all objects' colors of nature and raising display quality and competitive strength of the liquid crystal display.

Another objective of the present invention is to provide a driving method of the multiple primary colors liquid crystal display to perform multiple primary colors display by two color frames and accordingly to enormously expand color gamut of the liquid crystal display for basically and completely achieving all objects' colors of nature.

For realizing the aforesaid objective, the present invention provides multiple primary colors liquid crystal display, comprising a LED backlight source and a liquid crystal display panel positioned on the LED backlight source; the LED backlight source comprises a plurality of red, green, blue and cyan LEDs; the liquid crystal display panel comprises a CF substrate, and the CF substrate comprises a plurality of red, green and blue filters, and each of the red, green and blue filters corresponds to a sub pixel, and transmission spectrums of the green and the blue filters comprises a wavelength range of cyan light emitted by the cyan LEDs.

The multiple primary colors liquid crystal display shows an entire image by a combination of first and second color frames; the red, green and blue LEDs are activated as showing the first color frame, and lights transmitting through the red, green and blue filters respectively are red light R, green light G and blue light B to construct a first sub frame of the entire image; the red and cyan LEDs are activated as showing the second color frame, and lights transmitting through the red, green and blue filters respectively are the red light R, a first cyan light C1 and a second cyan light C2 to construct a second sub frame of the entire image.

A wavelength range of the red light emitted by the red LEDs is 620-660 nm, and a peak width at half height thereof is 25-40 nm; a wavelength range of the green light emitted by the green LEDs is 520-540 nm, and a peak width at half height thereof is 20-40 nm; a wavelength range of the blue light emitted by the blue LEDs is 435-460 nm, and a peak width at half height thereof is 15-25 nm; a wavelength range of the cyan light emitted by the cyan LEDs is 490-520 nm, and a peak width at half height thereof is 20-40 nm.

A transmission spectrum of the green filter is 460-630 nm; a transmission spectrum of the blue filter is 400-530 nm.

A wavelength of the red light emitted by the red LEDs is 632 nm, and the peak width at half height thereof is 32 nm; a wavelength of the green light emitted by the green LEDs is 539 nm, and the peak width at half height thereof is 25 nm; a wavelength of the blue light emitted by the blue LEDs is 450 nm, and the peak width at half height thereof is 18 nm; a wavelength of the cyan light emitted by the cyan LEDs is 509 nm, and the peak width at half height thereof is 26 nm; wavelengths of the first cyan light C1 and the second cyan light C2 respectively are 510 nm and 505 nm.

The red light R of the first color frame and the red light R of the second color frame respectively provide half of red light required for the entire image.

Gray scales of the first cyan light C1 and the second cyan light C2 are different, and the entire image is shown by the five primary colors, red, green, blue, first cyan and second cyan.

Gray scales of the first cyan light C1 and the second cyan light C2 are the same, and the entire image is shown by the four primary colors, red, green, blue and cyan.

The liquid crystal display panel further comprises a TFT substrate positioned under the CF substrate and a liquid crystal layer located between the TFT substrate and the CF substrate.

The present invention further provides a driving method of a multiple primary colors liquid crystal display, comprising steps of:

step 1, inputting R, G, B signals to show an entire image;

step 2, implementing color conversion to the R, G, B signals to be converted into R, G, B, C1, C2 colors space;

step 3, implementing gamma correction to R, G, B, C1, C2 signals to obtain R', G', B', C1 ', C2' gray scale signals after correction;

step 4, outputting the R', G', B' gray scale signals as a first color frame;

step 5, outputting the R', C1', C2' gray scale signals as a second color frame.

A gray scale of the R' gray scale signal in the step 4 and a gray scale of the R' gray scale signal in the step 5 are the same.

The benefits of the present invention are: according to a multiple primary colors liquid crystal display of the present invention, the red, green and blue LEDs are activated as showing the first color frame, and the lights transmitting through the red, green and blue filters respectively are red light R, green light G and blue light B; the red and cyan LEDs are activated as showing the second color frame, and the lights transmitting through the red, green and blue filters respectively are the red light R, a first cyan light C1 and a second cyan light C2. Therefore, multiple primary colors display is achievable to enormously expand the color gamut of the liquid crystal display for basically and completely achieving all objects' colors of nature and raising display quality and competitive strength of the liquid crystal display. According to a driving method of the multiple primary colors liquid crystal display of the present invention, performing multiple primary colors display by two color frames can be realized and accordingly the color gamut of the liquid crystal display is enormously expanded for basically and completely achieving all objects' colors of nature with sequentially implementing conversion and correction to the R, G, B signals.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution, as well as beneficial advantages, of the present invention will be apparent from the following detailed description of an embodiment of the present invention, with reference to the attached drawings.

In drawings.

DETAILED DESCRIPTION OF PREFERRED EMBODIMENTS

Embodiments of the present invention are described in detail with the technical matters, structural features, achieved objects, and effects with reference to the accompanying drawings as follows.

Figure 1:
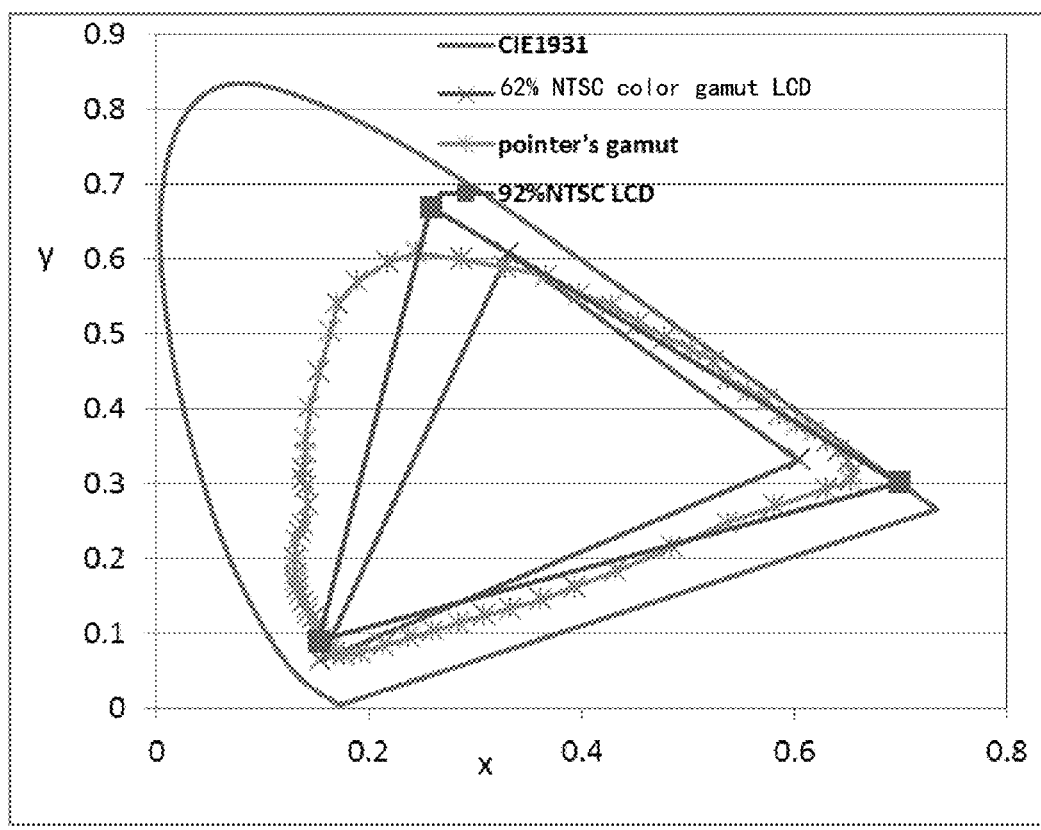
FIG. 1 is a color gamut diagram of a liquid crystal display according to prior art.
Figure 2:
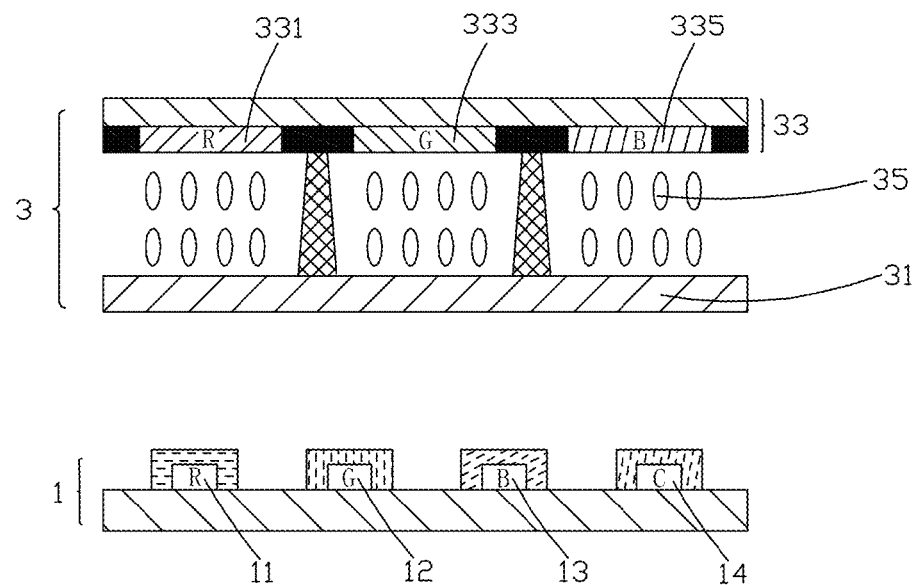
FIG. 2 is a diagram of a multiple primary colors liquid crystal display according to the present invention.
Figure 3:
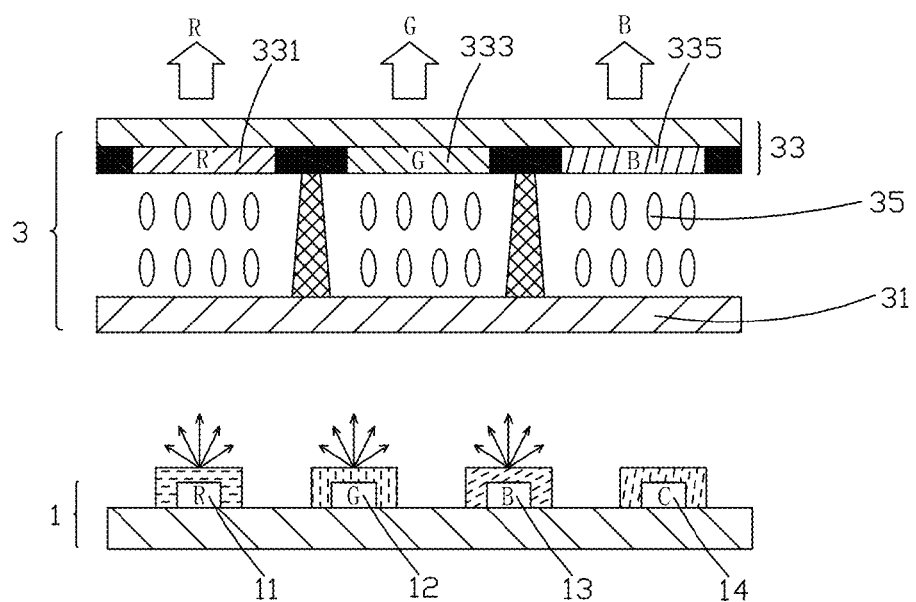
FIG. 3 is a diagram of a multiple primary colors liquid crystal display showing a first color frame according to the present invention.
Figure 4:
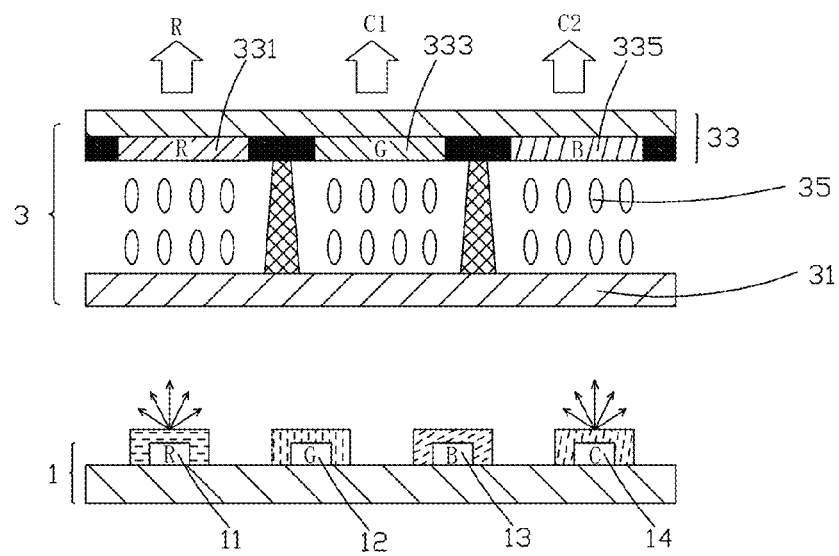
FIG. 4 is a diagram of a multiple primary colors liquid crystal display showing a second color frame according to the present invention.

Please refer from FIG. 2 to FIG. 4. The present invention provides a multiple primary colors liquid crystal display. The multiple primary colors liquid crystal display comprises a LED backlight source 1 and a liquid crystal display panel 3 positioned on the LED backlight source 1.

The LED backlight source comprises a plurality of red LEDs 11, green LEDs 12, blue LEDs 13 and cyan LEDs 14. The plurality of red LEDs 11, green LEDs 12, blue LEDs 13 and cyan LEDs 14 are alternately aligned.

Specifically, a wavelength range of the red light emitted by the red LEDs 11 is 620-660 nm, and a peak width at half height (FWHM) thereof is 25-40 nm; a wavelength range of the green light emitted by the green LEDs 12 is 520-540 nm, and a peak width at half height thereof is 20-40 nm; a wavelength range of the blue light emitted by the blue LEDs 13 is 435-460 nm, and a peak width at half height thereof is 15-25 nm; a wavelength range of the cyan light emitted by the cyan LEDs 14 is 490-520 nm, and a peak width at half height thereof is 20-40 nm.

Figure 5:
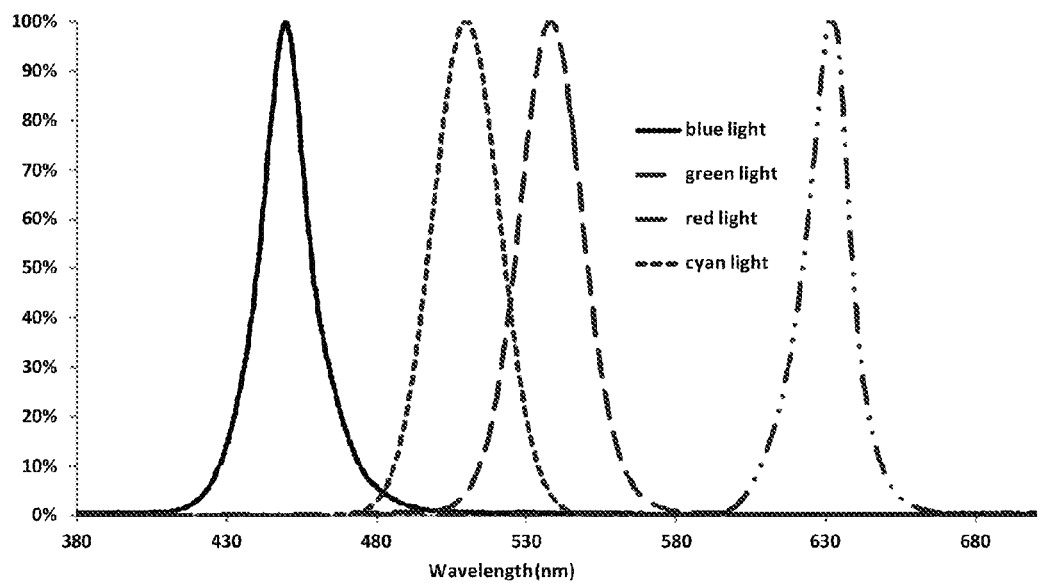
FIG. 5 is a spectrogram of R, G, B, C colors LEDs in the multiple primary colors liquid crystal display according to the present invention.

Furthermore as shown in FIG. 5, in this embodiment employed in the present invention, a wavelength of the red light emitted by the red LEDs 11 is 632 nm, and the peak width at half height thereof is 32 nm; a wavelength of the green light emitted by the green LEDs 12 is 539 nm, and the peak width at half height thereof is 25 nm; a wavelength of the blue light emitted by the blue LEDs 13 is 450 nm, and the peak width at half height thereof is 18 nm; a wavelength of the cyan light emitted by the cyan LEDs 14 is 509 nm, and the peak width at half height thereof is 26 nm.

The liquid crystal display panel 3 further comprises a TFT substrate 31 positioned under the CF substrate 33 and a liquid crystal layer 35 located between the TFT substrate 31 and the CF substrate 33.

Figure 6:
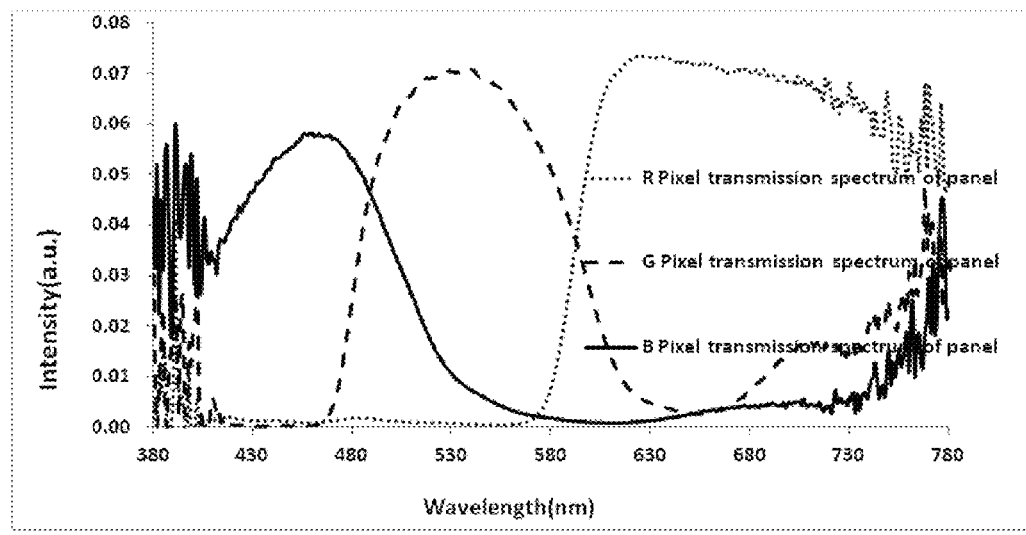
FIG. 6 is a spectrum diagram of a CF substrate in the multiple primary colors liquid crystal display according to the present invention.

The CF substrate 33 comprises a plurality of red filters 331, a plurality of green filters 333 and a plurality of blue filters 335, and each of the red, green and blue filters 331, 333, 335 corresponds to a sub pixel. The red, green and blue filters 331, 333, 335 can be aligned in any arbitrary sequences. Specifically, transmission spectrums of the green and the blue filters comprise a wavelength range of cyan light emitted by the cyan LEDs 14 to ensure that the cyan light emitted by the cyan LEDs 14 possesses capability of transmission. Specifically, as shown in FIG. 6, a transmission spectrum of the green filter 333 is 460-630 nm, and a transmission spectrum of the blue filter 335 is 400-530 nm, which either comprises the wavelength range 490-520 nm of the cyan light emitted by the cyan LEDs 14.

Figure 7:
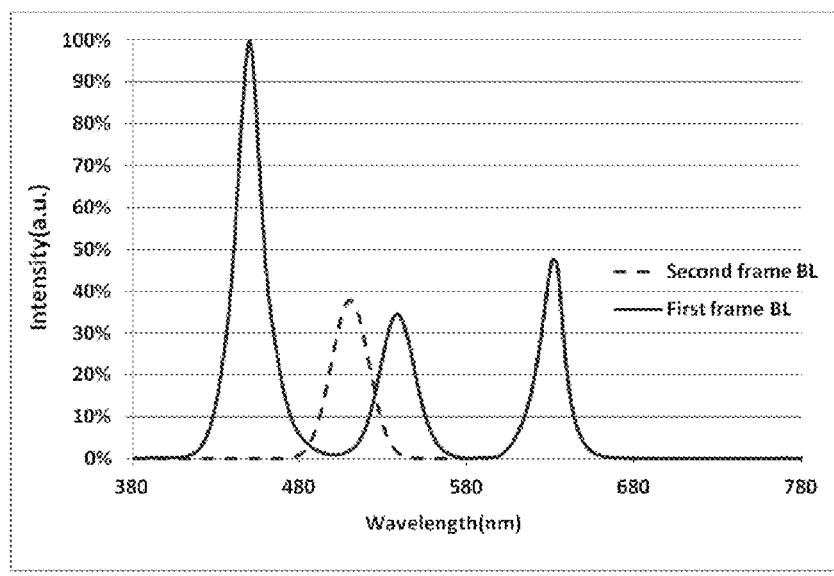
FIG. 7 is a backlight spectrogram of a first color frame and a second color frame of the multiple primary colors liquid crystal display according to the present invention.

The multiple primary colors liquid crystal display shows an entire image by a combination of first and second color frames. As shown in FIG. 3, the red, green and blue LEDs 11, 12, 13 are activated and the cyan LEDs 14 are deactivated as showing the first color frame. The backlight spectrogram of the first color frame is shown in FIG. 7. Meanwhile, the respective sub pixels corresponding to the red, green and blue filters 331, 333, 335 are activated. The lights transmitting through the red, green and blue filters 331, 333, 335 respectively are red light R, green light G and blue light B to construct a first sub frame of the entire image; as shown in FIG. 4, the red and cyan LEDs are activated and the green LEDs and the blue LEDs 12, 13 are deactivated as showing the second color frame. The backlight spectrogram of the second color frame is shown in FIG. 7. Meanwhile, the respective sub pixels corresponding to the red, green and blue filters 331, 333, 335 are activated. The lights transmitting through the red, green and blue filters 331, 333, 335 respectively are the red light R, a first cyan light C1 and a second cyan light C2 to construct a second sub frame of the entire image.

Furthermore, the red light R of the first color frame and the red light R of the second color frame respectively provide half of red light required for the entire image.

The gray scales of the first cyan light C1 and the second cyan light C2 can be calculated according to an algorithm.

Figure 8:
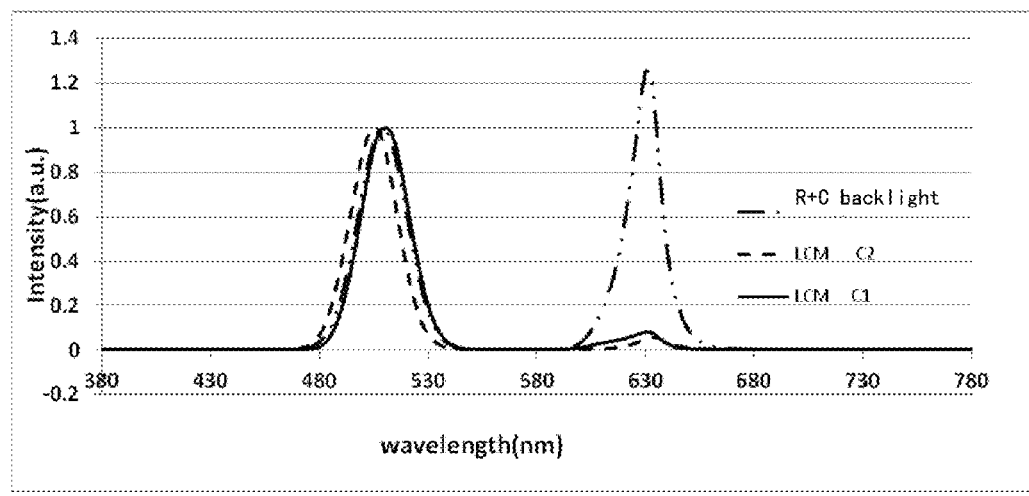
FIG. 8 is a spectrogram of the C1 light and the C2 light shown in the second color frame of the multiple primary colors liquid crystal display according to the present invention.
Figure 9:
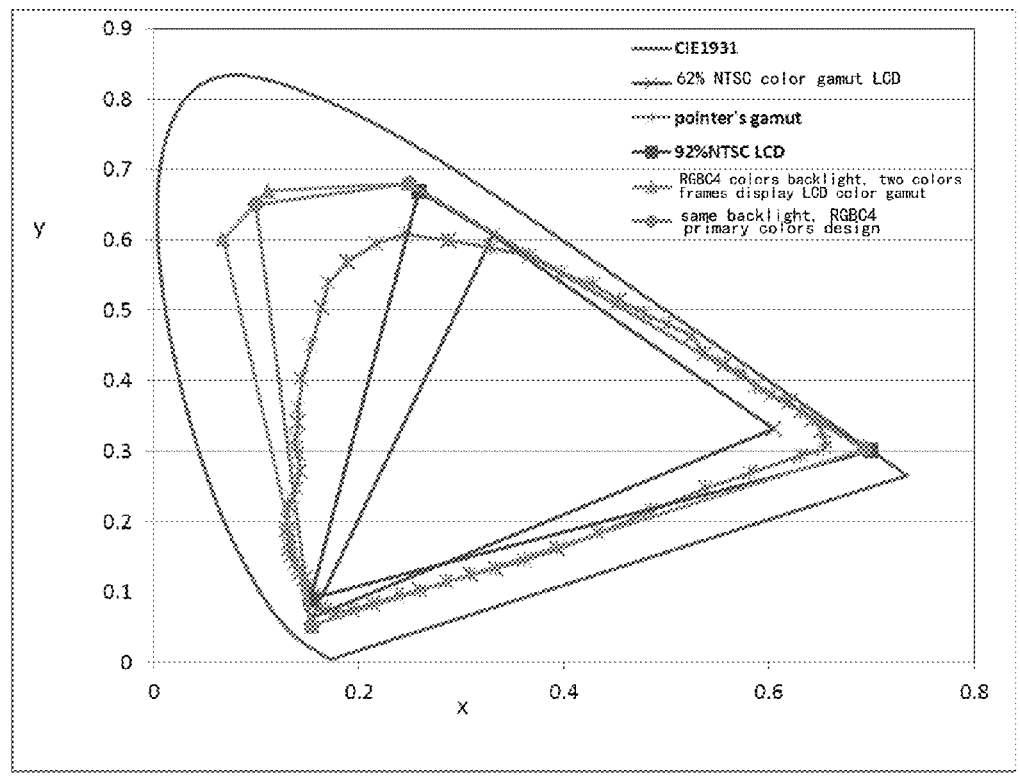
FIG. 9 is a color gamut comparison diagram of the multiple primary colors liquid crystal display according to the present invention and the liquid crystal display according to prior art.

If a RGB to RGBC1C2 five primary colors algorithm is utilized, the calculated gray scales of the first cyan light C1 and the second cyan light C2 are different. The entire image is shown by the five primary colors, red, green, blue, first cyan and second cyan. Specifically, as shown in FIG. 8, in this embodiment employed in the present invention, the gray scales of the first cyan light C1 and the second cyan light C2 are set to be different. After the cyan light emitted by the cyan LEDs 14 transmits the green and blue filters 333, 335, the wavelength of the first cyan light C1 is 510 nm, and the peak width at half height thereof is 26 nm, and the wavelength of the second cyan light C2 is 505 nm, and the peak width at half height thereof is 25 nm. Thus, the left and right shifts of the wavelength of the spectrogram occur relative to the cyan light which the wavelength is 509 nm emitted by the cyan LEDs 14. Two cyan light dots are generated and the color gamut is expanded. As shown in FIG. 9, the color gamut of the multiple primary colors liquid crystal display can reach up to 136% and basically covers the range of all objects' colors of nature when the entire image is shown by the five primary colors, red, green, blue, first cyan and second cyan.

If the a RGB to RGBC four primary colors algorithm is utilized, the calculated gray scales of the first cyan light C1 and the second cyan light C2 are the same. The entire image is shown by the four primary colors, red, green, blue and cyan. As shown in FIG. 9, the color gamut of the multiple primary colors liquid crystal display is 128% which is smaller than the 136% of the five primary colors display when the entire image is shown by the four primary colors, red, green, blue and cyan. Thus, it is possible to take full advantage of the first cyan light C1 and the second cyan light C2 to expand the color gamut of the liquid crystal display with proper algorithm.

Figures 10, 11:
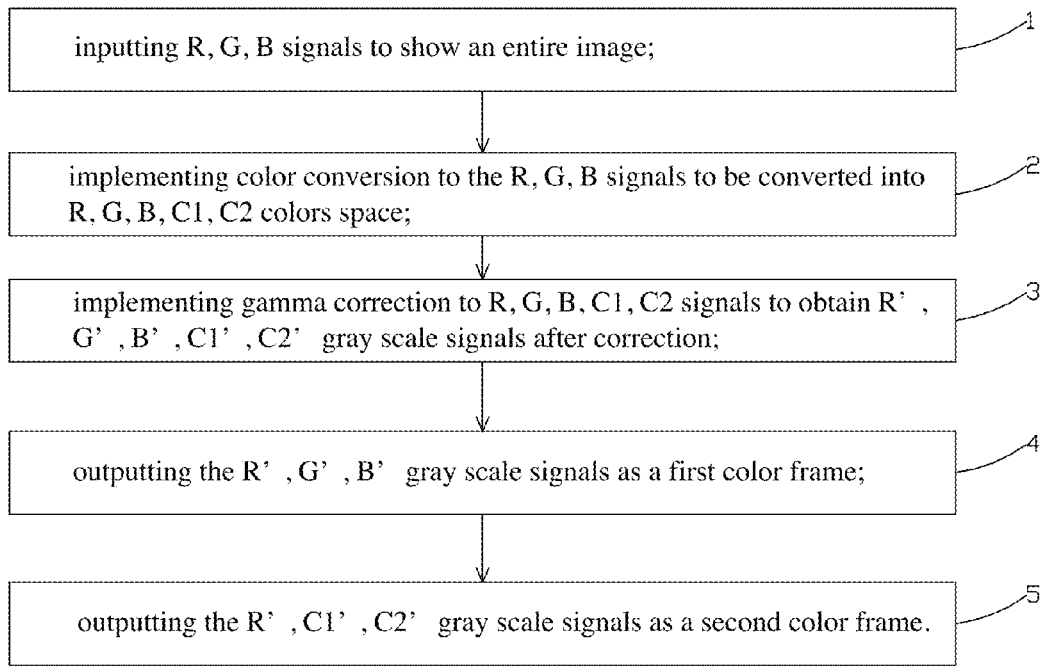
FIG. 10 is a transmission rate comparison table of the multiple primary colors liquid crystal display according to the present invention and the liquid crystal display according to prior art.
FIG. 11 is a flowchart of a driving method of the multiple primary colors liquid crystal display according to the present invention.

Significantly, the multiple primary colors liquid crystal display of the present invention not only can expand the color gamut but also raise the light transmission rate. As shown in FIG. 10, the light transmission rate of the multiple primary colors liquid crystal display according to the present invention is 7.70% as showing the first color frame and is 8.71% as showing the second color frame, which either is larger than 7.30%, the light transmission rate of the products according to prior arts.

Please refer to FIG. 11 with FIG. 3, FIG. 4. On the basis of the multiple primary colors liquid crystal display, the present invention further provides a driving method of the multiple primary colors liquid crystal display, comprising steps of:

step 1, inputting R, G, B signals to show an entire image;

step 2, implementing color conversion to the R, G, B signals to be converted into R, G, B, C1, C2 colors space;

step 3, implementing gamma correction to R, G, B, C1, C2 signals to obtain R', G', B', C1 ', C2' gray scale signals after correction;

step 4, outputting the R', G', B' gray scale signals as a first color frame;

step 5, outputting the R', C1', C2' gray scale signals as a second color frame.

Specifically, the step 2 utilizes the following formulas to implement color conversion to the R, G, B signals to be converted into R, G, B, C1, C2 colors space:

$$\begin{bmatrix} X \\ Y \\ Z \end{bmatrix} = B_{3\times 5} \begin{bmatrix} R \\ G \\ B \\ C_1 \\ C_2 \end{bmatrix} \quad B_{3\times 5} = \begin{Bmatrix} r'_{11} & r'_{12} & r'_{13} & r'_{14} & r'_{15} \\ g'_{21} & g'_{22} & g'_{23} & g'_{24} & g'_{25} \\ b'_{31} & b'_{32} & b'_{33} & b'_{33} & b'_{33} \end{Bmatrix} \quad (1)$$

$$\begin{bmatrix} X' \\ Y' \\ Z' \end{bmatrix} = C_{3\times 4} \begin{bmatrix} R \\ G \\ B \\ C_1 \end{bmatrix} = D_{3\times 3} \begin{bmatrix} R \\ G \\ B \end{bmatrix} + P[C_1] \quad D_{3\times 3} = \begin{Bmatrix} r_{11} & r_{12} & r_{13} \\ g_{21} & g_{22} & g_{23} \\ b_{31} & b_{32} & b_{33} \end{Bmatrix} \quad (2)$$

$$\begin{bmatrix} X'' \\ Y'' \\ Z'' \end{bmatrix} = C'_{3\times 4} \begin{bmatrix} R \\ G \\ B \\ C_2 \end{bmatrix} = E_{3\times 3} \begin{bmatrix} R \\ G \\ B \end{bmatrix} + P'[C_2] \quad E_{3\times 3} = \begin{Bmatrix} r''_{11} & r''_{12} & r''_{13} \\ g''_{21} & g''_{22} & g''_{23} \\ b''_{31} & b''_{32} & b''_{33} \end{Bmatrix} \quad (3)$$

wherein R, G, B, C1, C2 respectively represent the signals of various colors, and X, Y, Z respectively represent chromaticity values of various signals in the CIE1931 standard chromaticity diagram.

Regarding formula (1), as the three sub pixels of the first and second color frames are completely activated (such as 8 bit liquid crystal display panel, and the three sub pixels completely activated as the highest gray scale, 255th grayscale), the white light chroma formed after the first and second color frames are implemented with sequential color overlay can be considered as the target chroma (such as X=0.28, Y=0.29). The white dots as the highest grayscale is activated can be utilized to obtain the matrix $B_{3\times 5}$ parameters in the formula (1).

The formula (2) and the formula (3) respectively are relationships of C1, C2 and R, G, B and can be derived from the present skill of converting R, G, B to R, G, B, C.

After the formula (2) and the formula (3) are substituted into the formula (1), the R, G, B, C1, C2 can be uniquely solved.

The step 3 aims to solve the color cast issue due to the response speed of the liquid crystals. By querying the preset over driving table to confirm the gamma correction values, the corresponding gamma correction is implemented to the R, G, B, C1, C2 signals to obtain R', G', B', C1', C2' gray scale signals after correction.

A gray scale of the R' gray scale signal in the step 4 and a gray scale of the R' gray scale signal in the step 5 are the same.

In conclusion, according to a multiple primary colors liquid crystal display of the present invention, the red, green and blue LEDs are activated as showing the first color frame, and the lights transmitting through the red, green and blue filters respectively are red light R, green light G and blue light B; the red and cyan LEDs are activated as showing the second color frame, and the lights transmitting through the red, green and blue filters respectively are the red light R, a first cyan light C1 and a second cyan light C2. Therefore, multiple primary colors display is achievable to enormously expand the color gamut of the liquid crystal display for basically and completely achieving all objects' colors of nature and raising display quality and competitive strength of the liquid crystal display. According to a driving method of the multiple primary colors liquid crystal display of the present invention, performing multiple primary colors display by two color frames can be realized and accordingly the color gamut of the liquid crystal display is enormously expanded for basically and completely achieving all objects' colors of nature with sequentially implementing conversion and correction to the R, G, B signals.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A multiple primary colors liquid crystal display, comprising: a LED backlight source and a liquid crystal display panel positioned on the LED backlight source; the LED backlight source comprises a plurality of red, green, blue and cyan LEDs; the liquid crystal display panel comprises a CF substrate, and the CF substrate comprises a plurality of red, green and blue filters, and each of the red, green and blue filters corresponds to a sub pixel, and transmission spectrums of the green and the blue filters comprise a wavelength range of cyan light emitted by the cyan LEDs;

the multiple primary colors liquid crystal display shows an entire image by a combination of first and second color frames; the red, green and blue LEDs are activated as showing the first color frame, and lights transmitting through the red, green and blue filters respectively are red light R, green light G and blue light B to construct a first sub frame of the entire image; the red and cyan LEDs are activated as showing the second color frame, and lights transmitting through the red, green and blue filters respectively are the red light R, a first cyan light C1 and a second cyan light C2 to construct a second sub frame of the entire image;

wherein a wavelength range of the red light emitted by the red LEDs is 620-660 nm, and a peak width at half height thereof is 25-40 nm; a wavelength range of the green light emitted by the green LEDs is 520-540 nm, and a peak width at half height thereof is 20-40 nm; a wavelength range of the blue light emitted by the blue LEDs is 435-460 nm, and a peak width at half height thereof is 15-25 nm; a wavelength range of the cyan light emitted by the cyan LEDs is 490-520 nm, and a peak width at half height thereof is 20-40 nm.

2. The multiple primary colors liquid crystal display according to claim 1, wherein a transmission spectrum of the green filter is 460-630 nm; a transmission spectrum of the blue filter is 400-530 nm.

3. The multiple primary colors liquid crystal display according to claim 1, wherein the red light R of the first color frame and the red light R of the second color frame respectively provide half of red light required for the entire image.

4. The multiple primary colors liquid crystal display according to claim 1, wherein gray scales of the first cyan light C1 and the second cyan light C2 are different, and the entire image is shown by the five primary colors, red, green, blue, first cyan and second cyan.

5. The multiple primary colors liquid crystal display according to claim 1, wherein gray scales of the first cyan light C1 and the second cyan light C2 are the same, and the entire image is shown by the four primary colors, red, green, blue and cyan.

6. The multiple primary colors liquid crystal display according to claim 1, wherein the liquid crystal display panel further comprises a TFT substrate positioned under the CF substrate and a liquid crystal layer located between the TFT substrate and the CF substrate.

7. The multiple primary colors liquid crystal display according to claim 1, wherein the liquid crystal display panel further comprises a TFT substrate positioned under the CF substrate and a liquid crystal layer located between the TFT substrate and the CF substrate.

8. A multiple primary colors liquid crystal display, comprising: a LED backlight source and a liquid crystal display panel positioned on the LED backlight source; the LED backlight source comprises a plurality of red, green, blue and cyan LEDs; the liquid crystal display panel comprises a CF substrate, and the CF substrate comprises a plurality of red, green and blue filters, and each of the red, green and blue filters corresponds to a sub pixel, and transmission spectrums of the green and the blue filters comprise a wavelength range of cyan light emitted by the cyan LEDs;

the multiple primary colors liquid crystal display shows an entire image by a combination of first and second color frames; the red, green and blue LEDs are activated as showing the first color frame, and lights transmitting through the red, green and blue filters respectively are red light R, green light G and blue light B to construct a first sub frame of the entire image; the red and cyan LEDs are activated as showing the second color frame, and lights transmitting through the red, green and blue filters respectively are the red light R, a first cyan light C1 and a second cyan light C2 to construct a second sub frame of the entire image;

wherein a wavelength of the red light emitted by the red LEDs is 632 nm, and the peak width at half height thereof is 32 nm; a wavelength of the green light emitted by the green LEDs is 539 nm, and the peak width at half height thereof is 25 nm; a wavelength of the blue light emitted by the blue LEDs is 450 nm, and the peak width at half height thereof is 18 nm; a wavelength of the cyan light emitted by the cyan LEDs is 509 nm, and the peak width at half height thereof is 26 nm; wavelengths of the first cyan light C1 and the second cyan light C2 respectively are 510 nm and 505 nm.

9. The multiple primary colors liquid crystal display according to claim 8, wherein the red light R of the first color frame and the red light R of the second color frame respectively provide half of red light required for the entire image.

10. The multiple primary colors liquid crystal display according to claim 8, wherein gray scales of the first cyan light C1 and the second cyan light C2 are different, and the entire image is shown by the five primary colors, red, green, blue, first cyan and second cyan.

11. The multiple primary colors liquid crystal display according to claim 8, wherein gray scales of the first cyan light C1 and the second cyan light C2 are the same, and the entire image is shown by the four primary colors, red, green, blue and cyan.

* * * * *